June 3, 1969   P. CHARRANSOL   3,448,392
FAULT DETECTING AND ELIMINATING SYSTEM FOR ELECTRICAL CIRCUITS
Filed March 30, 1965

United States Patent Office 3,448,392
Patented June 3, 1969

3,448,392
FAULT DETECTING AND ELIMINATING SYSTEM FOR ELECTRICAL CIRCUITS
Pierre Charransol, Clichy, France, assignor to International Standard Electric Corporation, New York, N.Y., a corporation of Delaware
Filed Mar. 30, 1965, Ser. No. 443,850
Claims priority, application France, Apr. 17, 1964, 971,301
Int. Cl. G01r *19/00, 21/00, 23/00*
U.S. Cl. 330—2        4 Claims

ABSTRACT OF THE DISCLOSURE

Transistor output circuits are fused for their protection. The fuses are chosen so that they will open the output circuits when they are overloaded due to shorting in the corresponding transistors or due to other faults in the associated circuits. In order to minimize the time required to test a group of transistors to determine whether any of the transistors have shorted or are overloaded and to remove shorted or overloaded transistors from the circuits, a logic circuit is provided. The logic circuit is able, with proper sensors, to detect the presence or absence of an overload, indicative of a defect, in micro-seconds. If such a defect is detected, the logic circuit then applies a signal, of several milli-seconds' duration, which will cause destruction of the fuses connected only to transistors which have been found to be shorted internally or otherwise associated with faulty conditions.

---

Figure 1:
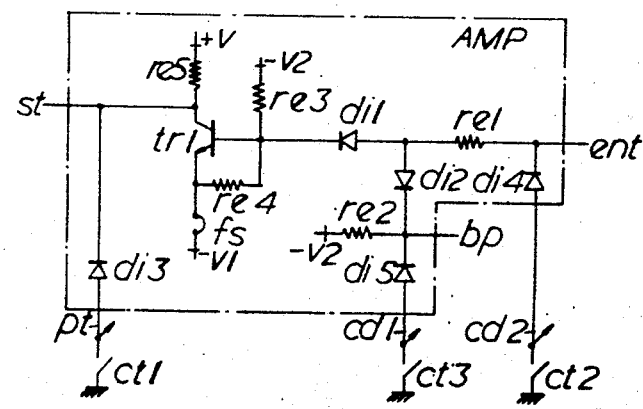

The present invention relates to a fault detecting and eliminating system for electrical circuits; and more particularly to a system making it possible to check, in a short period of time, the operation of a large number of similar circuits and to put out of service those circuits which are found to be defective.

For instance, in switching installations it happens that the communication channels are equipped with a piloting electrical circuit which will provide a signal when the line is free and will not provide a signal when the line is busy. To put through a call, it is necessary to find among all the existing lines those which are free and to choose one. Correct operation of the piloting circuits is therefore of primary importance, since a fault would risk bringing about the switching of a call, which is on the way of being established, onto a path that is already busy but whose circuit emits a signal indicating that it is free; such a result being strictly forbidden for call-secrecy reasons. Moreover, it is sometimes very difficult to remedy such a situation. Whereas, it is to be noted that if a piloting circuit does not emit a signal when the line is free, such a fault will make the line inaccessible but it does not bring disorder into the operation of the installation as a whole.

A primary object of the present invention is to provide a system enabling automatic and rapid determination of the condition of piloting circuits, and for putting out of service those circuits that emit a signal when they are not supposed to do so.

The present descrption, of course, is only an example of a special application of the invention. The invention may be applied in any system dealing with information wherever identical, or similar electrical circuits are being used therein. The invention, then enables through simple and inexpensive means, the detection of the existence of any failures and makes it possible to put out of service the faulty units so as to avoid all pertubations in the operation of the system.

One feature of the present invention is a fault eliminating system comprising means for putting those circuits to be checked into a condition such that they would normally not emit an outgoing signal; and, means for short-circuiting their outlets; each circuit being equipped with a protection fuse so that if any circuit emits an outgoing signal due to some defect, the short-circuit causes the blowing of the use, thus cutting off the power supply circuit and henceforth preventing the emitting of any outgoing signal.

According to another feature of the invention, the fault eliminating system comprises means for putting those circuits to be checked into several different conditions in such a way that they are not to produce any outgoing signal, so as to check various fault possibilities in the circuits.

Another featuer of the invention is a fault eliminating comprising means to put the circuits to be checked into one or several conditions such that they normally are not to produce any outgoing signal, and means for checking that no circuit emits any outgoing signal; also means for short-circuiting the outlets and effecting the blowing of fuses of the faulty circuits; however, only when the checking indicates that a fault has taken place. Such an arrangement affords an appreciable gain of time because the checking of the outlets is much faster than the flowing of the fuses.

According to another feature of the invention, the short-circuiting of the outlets is accomplished by means of two switching elements placed in series and controlled individually; so that in case one of these elements becomes conductive, by accident, the outlets will not be short-circuited permanently.

According to another feature of the invention, the operation of the switching elements, that help to short-circuit the outlets, is submitted to a checking by means of a detecting circuit able to signal the failure of one or the other switching elements, thus making it easy to locate the disturbance or breakdown.

According to another feature of the invention, these switching elements, helping to short-circuit the outlets, are two power transistors which are made conductive simultaneously when a fualt is ascertained, so as to earth or ground the outlets; their condition being checked by observation of the potential prevailing on the conductor which joins them; as this potential normally must have a determined value, a variation would indicate that one of the two transistors is in accidental short-circuited condition, whereas the direction of the variation indicates which of the two transistors is in a failing condition.

According to another feature of the invention, the potential prevailing on the conductor which links the two short-circuit transistors, is transmitted onto a detecing circuit effecting a comparison with a reference potential and, according to results obtained from this comparison, it will set into position two bistable circuits so as to provide a clear indication.

According to another feature of the invention, use is made of arrangements similar to those employed for the short-circuit of the outlets, in order to apply various controls to the circuits which are to be checked; the potentials which are applied being nevertheless appropriate to the commands to be supplied.

According to another feature of the invention, the installation comprises several checking and fault eliminating systems; the applying of a command or a short-circuit being accomplished through a first switching element proper to each system, and through a second switching element common to al the systems; one single detecting circuit being provided for the whole arrangement comprising the common switching element and as many individual switching elements as there are checking systems.

Figure 2:
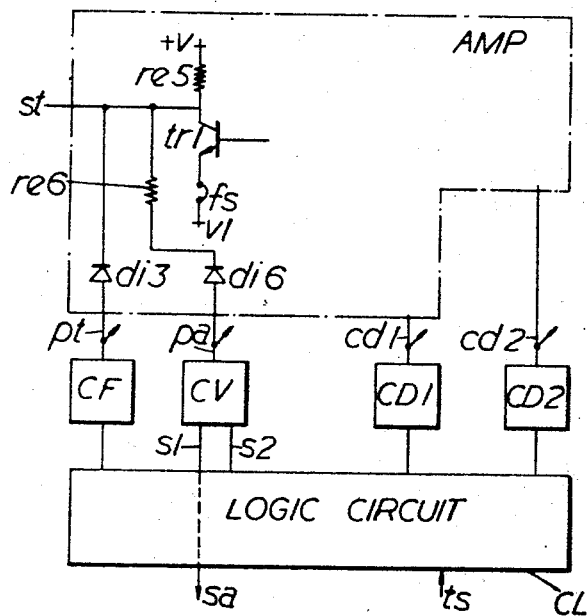
Figure 3:
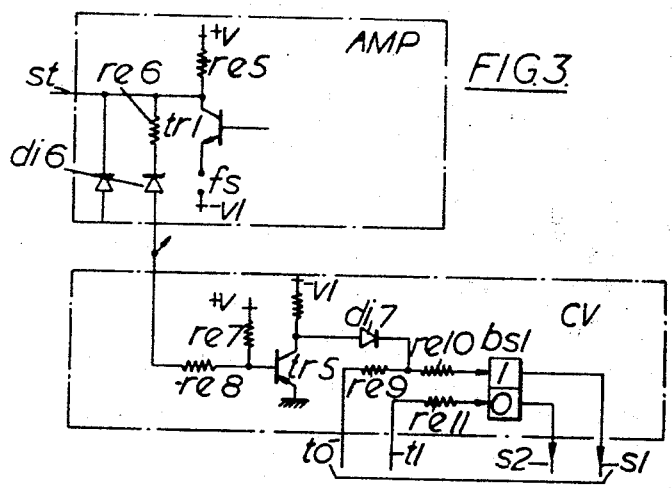
Figure 4:
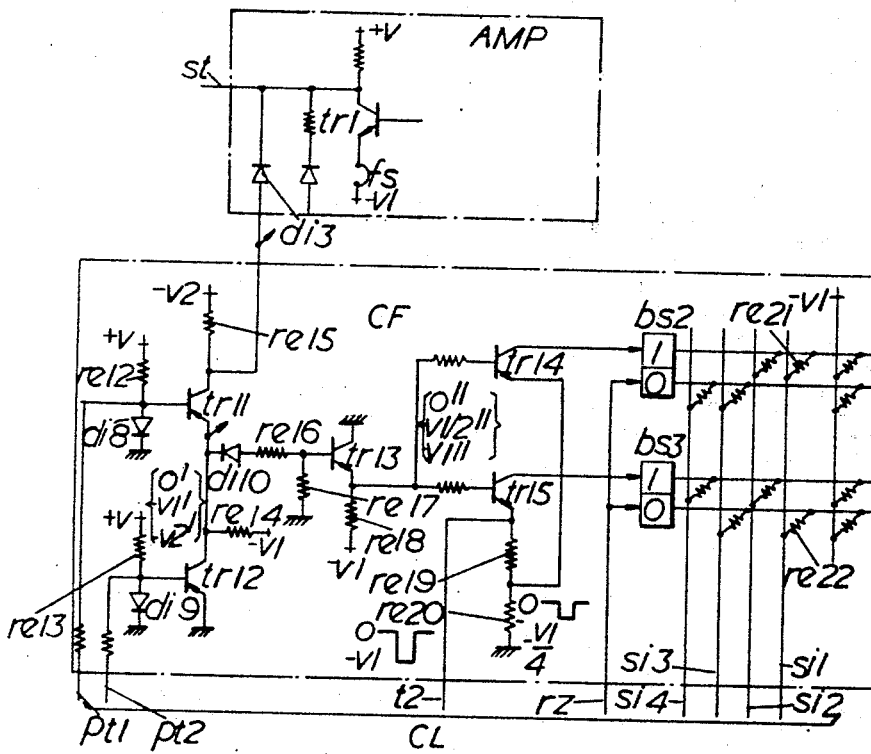

Different other features of the invention will become apparent from the description that follows, given by way of non-limiting example, in conjunction with the accompanying drawings, comprising:

FIG. 1, a circuit diagram of a fault eliminating system constructed in accordance with the present invention;

FIG. 2, a block diagram of a checking and fault eliminating system conformable to embodiments of the present invention;

FIG. 3, a detailed diagram of a circuit enabling to verify whether any of the circuits being checked are unduly emitting an outgoing signal; and FIG. 4, a detailed diagram of the device enabling to put into short-circuit condition the outlets of the circuits being checked.

Referring first to FIG. 1, a simplified embodiment of an aspect of the invention is shown in order to bring out clearly the principle of elimination of the faulty circuits which is important to the present invention. The system of eliminating faulty circuits is here applied to a group of switching amplifiers. The figure gives a diagram of one of them which is identified as the amplifier AMP.

The amplifier AMP is made up of an incoming coincidence circuit, associating wires $ent$ and $bp$ with the base of NPN transistor $tr1$. The collector of the transistor is connected onto the outgoing circuit. The entire arrangement is current-supplied by the voltage sources $+V$, $-V1$ and $-V2$. The voltage $-V2$ is more negative than voltage $-V1$. In the absence of any command, the wire $ent$ is at a negative potential. The base of transistor $tr1$ is more negative than its collector and emitter because it is biased by the voltage $-V2$ through the voltage divider which is made up of resistors $re3$ and $re4$. The transistor $tr1$ is therefore blocked and the outgoing wire $st$ is at potential $+V$ through resistor $re5$. When the earth is applied to wire $ent$, the current flows through resistor $re1$, diode $di2$ which becomes conducting, and resistor $re2$. The value of resistor $re2$ is such, that the potential of the anode of diode $di1$ does not rise high enough to get unblocked. The transistor $tr1$ remains therefore blocked. If at the same instant an earth is received on wire $bp$, the diode $di2$ remains blocked so that the diode $di1$ becomes conducting and a current flows in the emitter circuit of transistor $tr1$. The transistor $tr1$ saturates and the outgoing conductor $st$ is brought to potential $-V1$.

The above specification explains the normal operation of the amplifier AMP. Any failure, that results in rendering conductive the transistor $tr1$ outside of the conditions described above, must be corrected. Since the transistor $tr1$ is equipped with a protection fuse, the present invention provides for blowing this fuse, inside those amplifiers that fail, by short-circuiting the outgoing wire.

Therefore, elimination of the circuits which are at fault is effected before any operation is started implying the functioning of the amplifiers. For that purpose a control device represented by a simple contact $ct1$, applies an earth onto wires $pt$ of all the amplifiers. No other command being applied, transistors such as $tr1$ must be blocked, and this is normally an operation without any consequence. If a transistor is conductive, however, a a high current flows from contact $ct1$, wire $pt$, diode $di3$, through transistor $tr1$ and the fuse $fs$, up to source $-V1$. The intensity of this current is enough to blow rapidly the fuse $fs$, before the transistor will have suffered any damage. Then, the contact $ct1$ is opened. The amplifier in fault can no longer give out an outgoing negative signal and does no longer intervene in subsequent operations. An immediate signal can be given by the fuse $fs$ or by observance of the current flowing through contact $ct1$. It is also possible to effect periodical automatic maintenance operations to detect amplifiers out of service.

By the same process, the incoming circuit of the amplifiers can also be checked. For that purpose, after earthing wire $pt$, a circuit represented by contact $ct2$ is closed thus earthing the wire $ent$ of all the amplifiers through a diode $di4$. Normally, no transistor will start conducting, since wire $bp$ does not receive any signal. Then, contact $ct2$ is opened and contact $ct3$ is closed; and all the wires $bp$ are earthed through a diode $di5$. This time once more, no transistors normally will start conducting. However, in both cases, if an amplifier should accidentally become conducting, the fuse will blow.

Obviously, in practice, the eliminating circuits can be established by means of electronic switches such as transistors, instead of the electromechanical contacts shown in the figures.

The simplified process, just described above, has the advantage of requiring a relatively long time. The blowing of a fuse requires several tens and even hundreds of milliseconds, whereas the operating time of the electronic circuits is considered in microseconds. Now, with the above described process, it is necessary to provide, for every fault eliminating operation, a period of time equal to the time needed for having a fuse blown; without knowing whether a fault exists. It seems advisable, therefore, to effect this operation only in case of necessity, that is to say after having noted the existence of a fault.

FIG. 2 shows the block diagram of a checking and eliminating of faulty circuits system, in which the process is accomplished in two steps: a checking operation having as its purpose to detect the existence of an amplifier in fault, then, if need be, putting the outlets into short-circuit condition in order to eliminate the fault. The time necessary for a checking operation is very short, a few microseconds. Defects being rarer, this arrangement will afford therefore a very appreciable gain of time.

The amplifier AMP in the diagram of FIG. 2 is the same amplifier as in FIG. 1, but only the elements necessary for the description of related components in FIG. 2 are shown.

When the amplifiers are to be checked, the logic circuit CL receives a command on wire $ts$. It puts into operation, successively, the command devices CD1 and CD2 that apply upon wires $cd1$ and $cd2$ signals or commands enabling a check of various circuits of the amplifiers, in the manner described above. It does not, however, earth the wires $pt$. A checking circuit CV is connected-through a wire $pa$, a decoupling diode $di6$ and a resistor $re6$ onto wire $st$ of each one of the amplifiers. As long as none of the amplifiers become conductive, the wires $st$ remain positive and the circuit CV provides a signal upon wire $s1$. When the various tests have been accomplished, this signal is retransmitted onto wire $sa$—through logic circuit CL—by means of a circuit shown in dotted line on the diagram, so as to indicate that the amplifiers tested are in condition to be utilized.

If, during a test, one of the amplifiers happens to be conducting, the potential of one of the wires $st$ becomes negative; this is detected by the circuit CV. The signal is transferred from wire $s1$ onto wire $s2$. The logic circuit CL will then maintain the conditions creating the defective functioning and an order is transmitted onto a fuse blowing control circuit CF, which connects wires $pt$ to earth. In the one or several amplifiers in fault, the fuse $fs$ is blown. The functioning of device CF lasts a sufficient period of time to blow the one or many fuses for certain. When a long enough period of time for functioning of CF has elapsed, the earthing of wires $st$ ceases. If the fuses of the amplifiers in fault have indeed blown, then the circuit CV sees appearing again the positive potential and the checking operations can resume once more normally.

FIG. 3 gives the diagram of an embodiment of the checking circuit CV shown in FIG. 2. It uses, mainly, a transistor $tr5$ and a bistable circuit $bs1$. The transistor $tr5$ is normally blocked by the bias potential $+V$ applied to its base through resistor $re7$. The bistable $bs1$ is represented by two juxtaposed rectangles containing digits 1 and 0. The incoming wires are positioned on the left in the figure and have an arrow indicating the incoming direction of the control signal; the outgoing wires are positioned on the right. It gets into position 0 when it receives a negative impulse, sent by the logic circuit CL, along wire t1; it then emits an outgoing negative signal upon wire s2. It then gets onto 1 when an impulse applied by the logic circuit CL upon wire t0 reaches its higher inlet through resistors re9 and re10. The negative signal is switched onto wire s1.

Every checking operation of the amplifiers, conducted by the logic circuit CL, starts by the receiving of a negative impulse upon wire t1. It is applied to the inlet 0 of bistable bs1 and puts the latter into condition 0. Simultaneously, the logic circuit applies a command for checking of the amplifiers. According to condition of the amplifiers, in respect of command under consideration, all the wires st remain positive or at most one of them becomes negative. In the first case, the transistor tr5 remains blocked. Then, a negative impulse is received from the logic circuit upon wire t0; the bistable bs1 is put into position 1 to indicate that the amplifiers are in a good condition. It supplies a negative signal on wire s1 that the logic circuit CL can use to step onto the next checking stage, or, if all the checkings are accomplished, to transmit a signal upon wire sa (FIG. 2).

If one of the amplifiers is in fault, the corresponding wire st is negative. The transistor tr5 is conducting and the current produced by the negative impulse, which is received on wire t0, is flown out by diode di7 and transistor tr5 instead of causing the triggering of bistable bs1. The bistable remains in the position 0 and supplies the signal s2 which is then used by logic circuit CL in order to command the fuse blowing operation. During all this latter operation, the logic circuit CL does no longer take into account the position of the bistable bs1.

Now will be described the fuse blowing control circuit CF (FIG. 2) represented in detail by FIG. 4. In FIG. 1, the short-circuiting of the fuses is accomplished by the closing of contact ct1. In practice, as shown by FIG. 4, the short-circuit is established through two power transistor tr11 and tr12. Only one would suffice to fill up the proposed function, but if through accident it should become permanently conducting, all the amplifiers would risk to be put out of service, which is inadmissible. Two transistors are therefore connected in series and a checking circuit checks constantly their condition.

In the absence of any command from the logic circuit, the transistors tr11 and tr12 are both blocked by a positive bias (resistor re12-diode di8, resistor re13-diode di9). The diode di3 is blocked.

When the fuse of an amplifier AMP must be destroyed, the logic circuit CL applies, through means not shown in the figure, a negative impulse of 400 ma., for instance, on wires pt1 and pt2. The transistor tr12, whose emitter is earthed and collector biased negatively by source voltage −V1 through resistor re14, becomes conducting. The transistor tr11, whose emitter is connected onto the collector of tr12 and whose collector is negatively biased by the source −V2, through the resistor re15, becomes conducting in the same conditions. The potential of the collector of tr11 becomes practically null, and the diode di3 is rendered conducting. If transistor tr1 being conducting, accidentally, in an amplifier, a strong current flows through the corresponding fuse fs and transistors tr1, tr11, and tr12. The fuse is blown. When the simultaneous control impulses are terminated, the two transistors get blocked once more.

The control circuit is connected between transistors tr11 and tr12, by means of diode di10 and the resistor re16. It observes the potential at that point, and, consequently, puts into position the bistables bs2 and bs3— identical to the bistable bs1. If both transistors are blocked, which is their normal condition, the potential −V1 is found through the resistor re14. If the transistor tr12 is conducting, the earth connection is found. If the transistor tr11 is conducting, the potential −V2 is found through resistor re15 in parallel upon the potential −V1 through resistor re14. These three values are symbolically shown on FIG. 4 by the indications (0′, −V1′, −V2′).

The transistor tr13, of type NPN, has the collector connected to earth and the emitter biased by the potential −V1, through the resistor re18. If the potential, brought into its base circuit is 0′, the current base-emitter is sufficient to saturate it, and its emitter is practically earthed. If the base circuit receives the potential −V′, the fall in voltage in the resistor re17 is such that the emitter potential of tr13 is about V½. If the base circuit receives the potential −V2′, the fall in voltage in the resistor re17 is such that the potential of the base is inferior to −V1 potential, through resistor re18. These three values are symbolically shown on the figure by the indications 0″, −V½″, −V1″, next to emitter circuit of transistor tr13. The are applied to the basis of the transistors tr14 and tr15.

In a normal period of time, the emitters of transistors tr14 and tr15 are earthed through resistors re19 and re20. There are therefore both blocked. Before any utilization of the circuit, the triggers bs2 and bs3 are put into position 0 by the applying of a negative impulse onto wire rz. When it is necessary to know the condition of the transistors tr11 and tr12, the logic circuit CL applies a negative impulse of −V1 amplitude upon wire t2, and therefore upon the emitter of tr15. If the transistor tr13 is blocked (−V1″), the transistor tr15 remains practically blocked. In the other two cases, it becomes conducting and transmits a negative impulse upon the upper inlet of the trigger bs3 which passes onto position 1. Moreover, by means of the voltage divider constituted by the resistors re19 and re20, a fraction of the impulse is sent onto the emitter of transistor tr14. Its amplitude is of −V¼, so that the transistor tr14 only becomes conducting if the transistor tr13 is saturated (0″). In this latter case, a negative signal is transmitted onto the upper inlet of trigger bs2 which passes onto position 1.

To the values picked up between the two transistors tr11 and tr12 and having as symbols 0′, −V1′, −V2′, it is possible therefore to make correspond the positions of bistables bs2 and bs3 according to the following table:

| Situation tr11, tr12 | | | | |
|---|---|---|---|---|
| tr11 | tr12 | Measure | bs2 | bs3 |
| Blocked | Conducting | 0′ | 1 | 1 |
| Do | Blocked | −V1′ | 0 | 1 |
| Conducting | do | −V2′ | 0 | 0 |

The outlets of both triggers are all connected to source of potential −V1 through decoupling resistors. They are also combined by a decoding matrix with resistors, in order to supply four distinct indications to be used by the logic circuit CL. For instance, the signalling wire si1 is connected by the resistor re21 to the outlet 1 of trigger bs2, and by the resistor re22 to the outlet 0 of the trigger bs3. There exists, therefore, two independent circuits for making wire si1 negative. In order to have wire si1 connected to earth, it is necessary that these two circuits be simultaneously earthed by the triggers bs2 and bs3. If the trigger bs2 is in position 1, its outlet 1 is negative and the wire si1 is negative. The same consideration apply if trigger bs3 is in position 0. Whereas, if trigger bs2 is in position 0, its outlet 1 is earthed. The same applies when trigger bs3 is in position 1. The wire si1 is negative when the trigger bs2 is in position 1, or when the trigger bs3 is in position 0. It is earthed only when the triggers bs2 and bs3 are: one in position 0 and the other in position 1. By referring to the above table, it is seen that all this corresponds to the indication −1, picked up when the transistors tr11 and tr12 are blocked.

In a similar way, it is possible to observe that when the transistor tr11 is conducting, while tr12 is blocked (−V2′), the triggers remain both in position 0 and their upper outlets are earthed. In this case, it is wire $si2$ which is earthed. When $tr12$ is conducting, while $tr11$ is blocked, the two triggers are in position 1 and it is wire $si3$ that is earthed. Also signalling wire $si4$ is shown on the figure, corresponding to an abnormal situation which must never be met with during the operation. Correspondence existing between condition of the observed transistors and marking the the signalling wires is summarized by the following table:

| Conditions | Marking |
|---|---|
| $tr11$ blocked<br>$tr12$ blocked | $si1$ |
| $tr11$ conducting<br>$tr12$ blocked | $si2$ |
| $tr11$ blocked<br>$tr12$ conducting | $si3$ |
| Abnormal situation | $si4$ |

The checking circuit just described above enables, therefore, the logic circuit CL to know at all times the condition of the short-circuit transistors and to signal any failure in a very accurate manner.

Moreover, it is to be noted in the figure that a multiplying arrow is shown between the two short-circuited transistors. It signifies that in case several groups of amplifiers are available for use, it is not necessary to provide a circuit CF per group, but merely provide just one tarnsistor, such as $tr11$, per group—the transistor $tr12$ being common to all groups—also to provide only one checking device; and that affords practically the same reliability. In such a case, for every fuse blowing operation, the logic circuit renders conducting the transistor $tr12$ and one transistor $tr11$ by means of separate controls.

The applying of the various controls to the amplifiers can be effected by means of devices (CD1 and CD2, FIG. 2) similar to the one just described above, by referring to FIG. 4. The logic circuit CL is a switching unit accomplishing a program of simple operation in answer to a command. It can be designed with the help of any conventional means.

What is claimed is:
1. A fault detecting and eliminating system comprising:
    an amplifier having an input circuit and an output circuit,
    circuit breaker means coupled to the common electrode of the input and output circuits,
    means including command devices for applying command signals successively to said input circuit,
    said amplifier including circuits responsive to said command signals to cause conduction of the amplifier if it is in an abnormal condition, but to produce no effect if the amplifier is in a normal condition,
    means including a checking circuit for detecting conduction of said amplifier and for providing an error signal accordingly, and
    means including a fuse blowing circuit responsive to said error signal for providing a potential to force open said circuit breaker and remove said amplifier from active operation.
2. A fault detecting and eliminating system substantially as claimed in claim 1, in which:
    the amplifier comprises a transistor biased so that it normally transmits desirable signals received over its input circuit.
3. A fault detecting and eliminating system substantially as claimed in claim 1, in which:
    the amplifier comprises a transistor biased so that it normally transmits desirable signals received over its input circuit, and
    the circuit breaker is connected, when it is forced open, to stop the transmission of normal signals from the transistor.
4. A fault detecting and eliminating system substantially as claimed in claim 1, in which:
    the amplifier comprises a transistor biased normally to transmit said desirable received signals through its collector-emitter circuit,
    the circuit breaker is connected in series with the common electrode of the input and output circuits of the transistor to open the output circuit of the transistor and prevent the transistor from transmitting any additional signals.

References Cited

UNITED STATES PATENTS

| 1,973,520 | 10/1930 | Belt. |
| 3,134,032 | 5/1964 | Mann _ _ _ _ _ _ _ _ _ _ _ 340—250 X |
| 3,165,725 | 1/1965 | Kelcourse _ _ _ _ _ _ _ _ _ _ 330—2 X |

OTHER REFERENCES

Article by John H. Rodgers, "Triggered Fuse for Load Protection," The Review of Scientific Instruments, vol. 35, No. 12, 1715, December 1964.

NATHAN KAUFMAN, *Primary Examiner.*

U.S. Cl. X.R.

330—24, 51; 340—248